United States Patent [19]

Mansfield, Jr. et al.

[11] Patent Number: 5,279,905
[45] Date of Patent: Jan. 18, 1994

[54] MINIATURE ZINC-AIR CELL HAVING AN INDIUM PLATED ANODE CUPE

[75] Inventors: Robert N. Mansfield, Jr., Valley View; Robert F. Scarr, Westlake, both of Ohio

[73] Assignee: Eveready Battery Company, Inc., St. Louis, Mo.

[21] Appl. No.: 848,497

[22] Filed: Mar. 9, 1992

[51] Int. Cl.⁵ .................... H01M 2/04; H01M 12/08
[52] U.S. Cl. ...................... 429/27; 429/175; 29/623.5; 427/405
[58] Field of Search ............... 429/27, 175, 181, 229; 29/623.5; 427/405

[56] References Cited

U.S. PATENT DOCUMENTS

| | | | |
|---|---|---|---|
| 3,650,825 | 3/1972 | Lihl | 427/405 X |
| 3,673,000 | 6/1972 | Ruetschi | 429/175 X |
| 4,121,018 | 10/1978 | Kocherginski et al. | 429/27 |
| 4,189,526 | 2/1980 | Cretzmeyer et al. | 429/27 X |
| 4,557,983 | 12/1985 | Sauer | 429/27 |
| 4,980,195 | 12/1990 | Olds | 427/405 X |
| 4,992,343 | 2/1991 | Nardi | 429/57 |
| 5,112,705 | 5/1992 | Hunter et al. | 429/206 |

FOREIGN PATENT DOCUMENTS

| | | |
|---|---|---|
| 1086309 | 1/1961 | Fed. Rep. of Germany . |
| 58-3204 | 4/1958 | Japan . |
| 64-059768 | 3/1989 | Japan . |
| 1-307161 | 12/1989 | Japan . |

*Primary Examiner*—Stephen Kalafut
*Attorney, Agent, or Firm*—Robert W. Welsh

[57] ABSTRACT

A miniature zinc-air cell employing an anode cup that has an inner indium layer deposited over a copper layer on a conductive substrate such that the indium layer contacts the anodic mixture of the cell so that the anodic mixture can be made with little or no mercury. A method for producing anode cups is also disclosed.

18 Claims, 1 Drawing Sheet

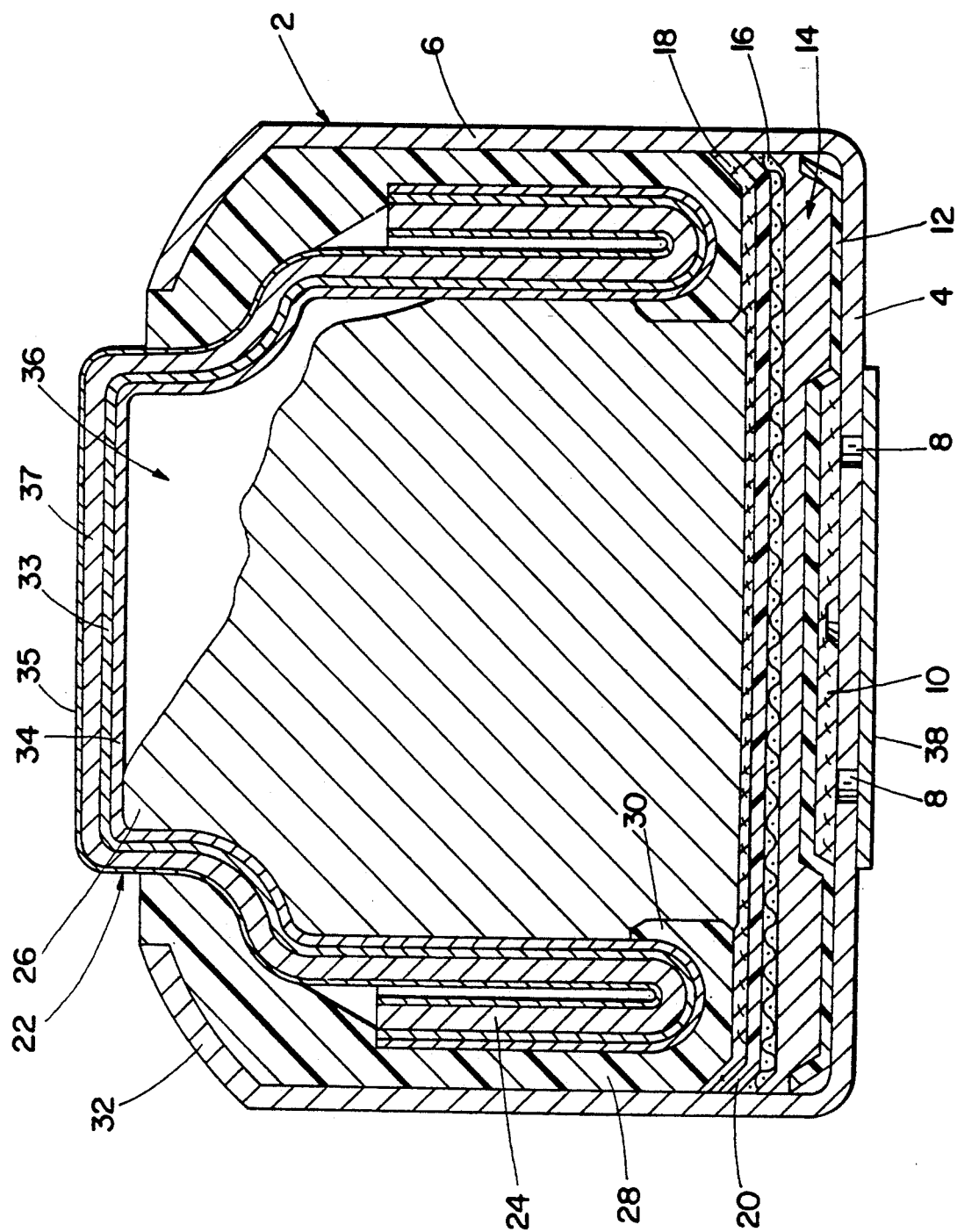

MINIATURE ZINC-AIR CELL HAVING AN INDIUM PLATED ANODE CUPE

FIELD OF THE INVENTION

The invention relates to a miniature zinc-air cell using an indium coated anode cup in which the indium layer of the anode cup contacts the zinc electrode of the cell and wherein the mercury normally employed in the zinc electrode is reduced to as low as zero percent.

BACKGROUND OF THE INVENTION

Alkaline electrochemical cells employing a zinc anode have become commercially important as a relatively high rate source of electrical energy. The alkaline electrolyte, which is usually concentrated aqueous potassium hydroxide, is a principal factor contributing to the ability of these cells to deliver high rates of electrical energy compared to the older Leclanche cells which utilize zinc chloride and/or ammonium chloride electrolytes. However, as is so often the case with technological advances, the presence of alkali in an electrochemical cell is a mixed blessing. For instance, alkali strongly promotes the reaction of water with zinc causing corrosion. Unless means are employed to control this reaction, the shelf life of alkaline zinc cells would be unacceptably short. In addition, since hydrogen gas is released in the reaction between alkali and zinc, there may be a danger of cell disassembly.

In commercial alkaline zinc cells, the reaction between zinc and alkali has been controlled or reduced to an acceptable rate by the addition of mercury to the cell. Unfortunately, it has recently become apparent that the introduction of mercury into the environment may be a hazard to human health as well as to other forms of life. While individual cells contain only a small amount of mercury, the very large number of zinc alkaline cells marketed today could cause significant quantities of mercury to enter the environment upon disposal of such cells.

U.S. Pat. No. 3,847,699 disclosed an alkaline zinc-manganese dioxide cell in which the proportion of mercury needed to achieve acceptable storage life can be reduced by the addition of small amounts of an ethylene oxide polymer.

U.S. Pat. No. 4,500,614 discloses an alkaline cell having an anode prepared by amalgamating an alloy powder made of zinc and at least two metals selected from the group consisting of gallium, indium and thallium. The metals are incorporated in the cell to reduce the amount of mercury required to prevent corrosion of the zinc in an alkaline electrolyte which causes generation of hydrogen gas and subsequent leakage of the electrolyte.

German Patent 1,086,309 discloses an alkaline zinc cell in which an indium compound is added to the electrolyte and/or indium metal is alloyed with refined zinc so as to protect the zinc against corrosion in an acidic, neutral or alkaline electrolyte.

Japanese Publication No. 1958-3204, published Apr. 26, 1958, recites that the addition of 0.0001% to 2.0% indium can be added to pure zinc base alloy containing one, two, or more of the metallic elements Fe, Cd, Cr, Pb, Ca, Hg, Bi, Sb, Al, Ag, Mg, Si, Ni, Mn, etc., to form a zinc alloy which has a high corrosion resistance and which is suitable for use in primary cells.

Japanese unexamined patent application 01-307161 is directed to a mercury-free alkaline cell wherein the negative electrode's collector is coated with indium and/or lead in which the coating can be supplied by any method such as electroplating.

As seen from the above, manufacturers of alkaline batteries have invested substantial amounts of time and money in the effort to develop mercury-free batteries. The first batteries to incorporate mercury-free constructions were the AA, C and D standard alkaline batteries. These batteries have historically used the largest quantities of mercury per cell and are the most common sizes and type purchased by consumers. Therefore, removing mercury from these batteries was the best way to significantly reduce the quantity of mercury that is currently entering the general waste stream when used alkaline cells are thrown away.

In addition to developing mercury-free standard alkaline batteries, battery manufacturers have also sought to develop miniature zinc-air battery constructions that are free of mercury. While a layman may believe that the technology used to produce mercury-free standard alkaline batteries can be used to produce mercury-free miniature zinc-air batteries, the manufacturers of miniature zinc-air batteries have found that additional technology had to be developed before mercury-free miniature zinc-air cells could be manufactured on a commercial basis. The construction of a miniature zinc-air battery is substantially different from the construction of a standard alkaline battery. These differences in construction have forced battery manufacturers to develop processes and techniques that pertain only to the miniature zinc-air cells.

It is an object of the present invention to provide a miniature zinc-air cell which has a reduced amount of mercury of less than 6%, preferably less than 3%, in the zinc-containing electrode and most preferably having a mercury-free zinc-containing electrode.

It is another object of the present invention to provide a miniature zinc-air cell with a zinc-containing electrode that is substantially free or completely free of mercury and wherein the surface of the electrode cup contacting the zinc-containing electrode has an undercoat of copper and a top coat of indium.

It is another object of the present invention to provide a method for producing an indium coated cup for housing a zinc-containing electrode of a miniature zinc-air cell.

These and other objects of the invention will be apparent from the following description.

SUMMARY OF THE INVENTION

The invention relates to a zinc-air cell employing a manganese dioxide-containing electrode (cathode) and a zinc-containing electrode (anode) assembled within a conductive housing comprising a cathode cup having at least one opening to permit air to enter and said cathode cup being electrically contacted to the manganese dioxide-containing electrode; an anode cup electrically and physically contacted to the zinc-containing electrode; said cathode cup secured to and insulated from the anode cup; and said anode cup comprising a conductive substrate having on a portion of at least the inner surface contacted to the zinc-containing electrode an underlayer of copper and a top layer of indium.

As used herein, the underlayer of copper could be pure copper or a copper alloy, preferably an alloy not containing an element that would be replaced by indium, and the top layer of indium could be pure indium or an indium alloy. The top layer of indium could be a continuous layer of indium for most cell applications operating at ambient temperature (20° C.) However, in some applications, such as high temperature environments, it may be preferred to have a discontinuous layer of indium in which some of the copper underlayer is exposed to contact the zinc-containing electrode. Preferably in cells for high temperature application, the indium layer could cover less than 95% of the surface area of the anode cup that contacts the zinc-containing electrode. This will expose a portion of the copper undercoat to contact the zinc-containing electrode. Thus, depending on the application for the zinc-air cell, the indium layer could be continuous or discontinuous. For most applications, the copper layer should be at least 1 microinch thick, preferably above 100 microinches thick, and most preferably from 1000 to 2000 microinches thick. The indium layer should be from 0.5 to 50 microinches thick, preferably from 1 to 5 microinches thick, and most preferably from 1 to 3 microinches thick. If the thickness of the indium layer exceeds 30 microinches the cost of the indium becomes exceedingly high while contributing no additional benefit. On the other hand if the thickness of the indium layer is less than 0.5 microinch then in most applications the amount would be insufficient to effectually eliminate mercury from the zinc-containing electrode without affecting the cell's characteristics. The substrate of the anode cup is preferably steel with a layer of nickel on one surface and a layer of copper on the other surface. The nickel plated layer is disposed on the outer surface of the cup and is used as one terminal for the cell. The copper plated layer is disposed on the inner surface of the cup over which a layer of indium is deposited. Thus the indium coating forms the inner layer of the cup and contacts the zinc-containing electrode. The conductive substrate could also be made of cold rolled steel, brass, and any other suitable metal.

The invention also is directed to a method for producing an anode cup for a zinc-air cell which comprises the steps:

(a) depositing on one side of a conductive sheet a layer of copper and then electrodepositing onto said copper layer a coating of indium; and (b) forming the coated sheet into a cup shaped configuration defining a cavity in which the indium layer forms the inner surface defining the cavity.

The anode cup could then be filled with a zinc-containing electrode and assembled with a cathode cup having at least one opening for permitting air to enter the cup and containing a manganese dioxide-containing electrode in which said anode cup is secured to and electrically insulated from the cathode cup using an insulative gasket.

Electroplating indium onto the copper surface of a laminated strip stock which is used to form miniature cell anode cups offers several advantages relative to other methods of depositing indium onto the surface of an alkaline cell's current collector. First, electrodepositing the indium onto strip stock means that the uniformity of the indium plating can be accurately controlled. This is particularly important since the configuration of the anode cup would effectively prevent the uniform deposition of indium onto the surface of a formed anode cup. Second, electroplating onto strip stock enables the manufacturer to accurately control the location of the plated indium. If formed cups were plated in a barrel plating operation, the indium would be plated also on the nickel surface as well as the copper surface. Selectively controlling the plating of indium onto only the copper surface is important to battery manufacturers because the indium must not be allowed to contaminate the nickel plated surface of the anode cup. Third, the preferred thickness of indium, which ranges from 1 microinch to approximately 5 microinches, can be readily obtained using an electrodeposition process. These quantities of indium generally cannot be attained by other conventional plating techniques, such as, relying upon indium ions in the electrolyte to plate onto the anode cup's surface. Fourth, in specific applications where a noncontinuous layer of indium is preferred, portions of the copper surface should be made to directly contact the anode material so that the cell's impedance does not increase excessively when the cells are stored at high temperature. Since the quantity of indium deposited onto the copper surface can be accurately controlled, the discontinuous character of the indium layer can be assured. Fifth, another advantage of the proposed invention is that the electrodeposition technique of this invention will work when chemical displacement of indium ions cannot be used. The chemical displacement process relies upon the presence of zinc or some other reducing component in a collector. The copper surface of a miniature zinc-air cell's anode cup does not contain zinc which the indium can replace. Therefore, the chemical displacement process cannot be used with a miniature anode cup whose inner layer is copper.

BRIEF DESCRIPTION OF THE DRAWING

The sole figure shows the cross-sectional view of a miniature zinc-air cell employing an anode cup in accordance with this invention.

DETAILED DESCRIPTION OF THE DRAWING

As shown in the drawing, the largest component of the zinc-air cell is an open ended metal container 2 identified as a cathode cup. The cathode cup 2 is generally made from nickel plated steel that has been formed such that it has a relatively flat central region 4 which is continuous with and surrounded by an upstanding wall 6 of uniform height. Two small holes 8 are punched into the bottom 4 of the cup 2 to act as air-entry ports. A layer of porous material 10 covers the interior surface of the air holes and acts as an air distribution membrane. A layer of polytetrafluoroethylene 12 covers the entire bottom of the cathode cup 2 including the air distribution membrane 10. The second major component is an air electrode 14 which is positioned adjacent the inside surface of the polytetrafluoroethylene layer 12. This electrode 14 contains several components, including: a metal screen 16; a mixture of manganese oxides and carbon embedded in the screen 16; a barrier film 18 which prevents the anode's electrolyte from moving into the cathode 14; and a soakup separator 20. The third component is a generally cup-shaped metal component 22 which forms the top of the cell and is generally referred to as the anode cup. In the figure, the edge 24 of the anode cup has been rolled backward upon itself thereby creating a double wall. The anode cup 22 can be made from a trilaminate material comprising copper 33 that has been laminated to the bare side of a nickel-clad steel strip. A nickel layer 35 protects the exterior surface of steel strip 37 which is located between nickel layer 35 and copper layer 33. Other laminated materials from which anode cups may be made include: a bilaminate of copper on a stainless steel substrate or a laminate made from more than three layers. Round disks punched from this laminated metal strip are then formed into anode cups. The copper layer forms the inside surface of the anode cup and directly contacts the anodic mixture. The structural and chemical makeup of the anode cup is an important aspect of this invention. The fourth component is the anodic mixture 26 which can comprise a mixture of zinc particles, electrolyte and organic compounds such as binders and corrosion inhibitors, which made up the battery's anode. Fifth, a tubular shaped ring or gasket 28 made from an elastomeric material, serves as the seal. The bottom edge of the gasket 28 has been formed to create an inwardly facing lip 30 which abuts the rim of the anode cup 22. The cathode cup 2 along with the inserted air electrode 14 and associated membranes, are inverted over and pressed against the anode cup/gasket assembly which are preassembled. While inverted, the edge of the cathode cup 2 is colleted inward. The rim 32 of the cathode cup is then compressed against the elastomeric gasket 28 between the cathode cup 2 and the anode cup 22 thereby forming a seal and an electrical barrier between the anode cup 22 and the cathode cup 2. A suitable tape 38 can be placed over the opening 8 until the cell is ready for use.

In accordance with this invention, a layer of indium 34 (shown exaggerated) is deposited on one side of the anode disc before it is formed into a cup 22 As shown in the drawing, the indium layer 34 forms the inner surface of cup 22 defining a cavity 36 into which the anodic mixture 26 is fed. As stated above, the indium layer could be a continuous layer or a discontinuous layer. Since the underlayer of the interior surface of the cup 22 is copper 33, then the chemical displacement process used in the art can not be used since this process relies on the presence of zinc or some other reducing component.

The following examples are provided to illustrate the concept of the invention and are not intended to limit the scope of the invention which is recited in the appended claims.

EXAMPLE 1

Several lots of miniature zinc-air cells were assembled in order to evaluate the impact of electroplating indium on the anode cup's interior surface. All cells measured approximately 0.455 inch in diameter by 0.210 inch high. These batteries are commonly referred to as "675 size". In the first of two tests, the control lot, designated lot A, has six percent mercury (Hg/Zn ratio) in the anode and the anode cup was not plated with indium. Lot B had no mercury in the anode and no indium plated onto the anode cup. Lots C through G had no mercury in the anode but the anode cups were plated with the following thicknesses of indium: lot C, one microinch; lot D, three microinches; lot E, fifteen microinches; lot F, thirty microinches; and lot G, fifty microinches. Each lot was separated into four sublots consisting of three cells each. All cells were then discharged continuously across a 625 ohm resister to 0.9 volts. The first sublot was tested within a few days after the cells had been assembled. The second sublot was aged for one week at 71° C. and then tested. The third sublot was aged for twenty days at 60° C. prior to testing. The fourth sublot was aged for forty days at 60° C. and then put on test. The milliamphours of service to the designated cutoff are shown in Table 1. These data support the unexpected conclusion that all cells in sublots 1, 2 and 3 with indium plated anode cups but no mercury in the anode provided more service than comparably aged cells in lot A (6% Hg and no In) or lot B (no Hg and no In). A clear conclusion cannot be drawn from the cells which were aged for forty days at 60° C. (i.e. sublots number four) because two of the five indium plated lots provided better service than the control while two other lots provided slightly less service and one lot had significantly less service. These inconsistent results are not unusual for cells tested at the relatively high temperature of 60° C. for forty days because some factor other than the collector/anode interface controls cell behavior under these conditions.

TABLE I

| Sub Lot | Cell Age | A 6% Hg/Zn (non-plated) | B Zero Hg (non-plated) | C | D | E indium plating thickness | F | G |
| --- | --- | --- | --- | --- | --- | --- | --- | --- |
| | | | | 1 micro in | 3 micro in | 15 micron in | 30 micro in | 50 micro in |
| 1 | Initial | 494 | 477 | 533 | 533 | 520 | 516 | 516 |
| 2 | 1 Wk/71 c. | 494 | 461 | 532 | 533 | 511 | 517 | 504 |
| 3 | 20 days/60 C. | 496 | 443 | 500 | 491 | 511 | 502 | 510 |
| 4 | 40 Days/60 C. | 491 | 461 | 504 | 487 | 480 | 504 | 423 |

Five cells from each of the lots and sublots were impedance tested after storage at 71° C. These data are shown in Table II. These data support the unexpected conclusion that mercury-free miniature alkaline zinc-air cells which contain indium-electroplated anode cups did provide significantly lower impedance values when compared to similarly aged cells containing no mercury and no indium, and comparable impedance when compared to cells containing six percent mercury and no indium.

TABLE II

| Cell Age | A 6% Hg/Zn (non-plated) | B Zero Hg (non-plated) | C | D | E indium plating thickness | F | G |
| --- | --- | --- | --- | --- | --- | --- | --- |
| | | | 1 micro in | 3 micro in | 15 micron in | 30 micro in | 50 micro in |
| Initial | 6.3 | 7.5 | 6.9 | 7.7 | 5.4 | 5.6 | 5.3 |
| 2 Weeks | 8.0 | 20.2 | 6.6 | 7.4 | 8.1 | 8.4 | 8.8 |
| 4 Weeks | 8.9 | 35.0 | 9.8 | 9.7 | 9.5 | 10.3 | 11.7 |
| 6 Weeks | 8.4 | 73.0 | 10.4 | 10.0 | 10.3 | 11.7 | 13.1 |
| 8 Weeks | 9.0 | * | 10.2 | 11.4 | 12.7 | 14.1 | 15.2 |

*Test stopped due to cell leakage

EXAMPLE 2

Several lots of miniature zinc air cells were assembled in order to evaluate the impact of electroplating indium onto the interior surface of anode cups that were incorporated into cells which also contained 0.2 mg of In in the anode mass per gram of zinc. The indium was added to the zinc as indium hydroxide. As in Example 1, all batteries in this test measured approximately 0.455 inch in diameter by 0.210 inch high. The control lot in this Example, designated lot A, is identical to the control lot in Example 1. In other words, the cells contained six percent mercury, no indium electroplated on the anode cup and no indium hydroxide added to the anode. Lot H contained no mercury, no indium plated on the anode cup and 0.2 mg of In in the anode mass per gram of zinc. Lots I and J were identical to lot H except that their anode cups were electroplated with indium approximately one microinch thick and three microinches thick, respectively. Each lot was separated into four sublots consisting of three cells each. All cells were then discharged continuously across a 625 ohm resistor to 0.9 volts. The first sublot was tested within a few days after the cells had been assembled. The second, third and fourth sublots were aged for: one week at 71° C.; twenty days at 60° C. and forty days at 60° C. prior to testing. The milliamphours of service to the designated cutoff are shown in Table III. The data support the conclusion that all cells in sublots 1, 2 and 3 with indium plated anode cups and no mercury in the anode provided more service than comparably aged cells in lot A or lot H. A clear conclusion cannot be drawn from the cells which were aged for forty days at 60° C. because the cells from lot I provided less service than the cells from lot A while the cells from lot J provided more service than the cells from lot A. As was explained earlier, this type of anomaly in service data is not unusual when cells are stored for a relatively long time (i.e. forty days) at a relatively high temperature (60° C.).

TABLE III

| Sub Lot | Cell Age | A 6% Hg/Zn (non-plated) | I Indium Plating Thickness 1 micro in* | J Indium Plating Thickness 3 micro in* | H Zero Hg (non-plated) |
|---|---|---|---|---|---|
| 1 | Initial | 494 | 514 | 544 | 507 |
| 2 | 1 Wk/71 C. | 494 | 515 | 526 | 480 |
| 3 | 20 Days/60 C. | 496 | 510 | 510 | 483 |
| 4 | 40 Days/60 C. | 491 | 485 | 523 | 455 |

*0.2 mg indium/gm zinc added as indium hydroxide

Five cells from each of the lots and sublots in this Example 2 were impedance tested after storage at 71° C. These data are shown in Table IV. These data support the conclusion that mercury-free miniature alkaline zinc-air cells which contained indium hydroxide in the anode and indium-electroplated anode cups did provide lower impedance values when compared to both similarly aged cells containing no mercury, no indium electroplated onto the anode cup, but indium hydroxide in the anode, or cells containing six percent mercury and no indium at all.

TABLE IV

| Cell Age | A 6% Hg/Zn (non-plated) | I Indium Plating Thickness 1 micro in* | J Indium Plating Thickness 3 micro in* | H Zero Hg (non-plated) |
|---|---|---|---|---|
| Initial | 6.3 | 8.0 | 6.7 | 7.4 |
| 2 Weeks | 8.0 | 7.1 | 7.3 | 10.6 |
| 4 Weeks | 8.9 | 7.6 | 8.3 | 11.6 |
| 6 Weeks | 8.4 | 7.4 | 8.5 | 16.5 |
| 8 Weeks | 9.0 | 7.9 | 8.9 | 19.9 |

*0.2 mg indium/gm zinc added as indium hydroxide

The following conclusions can be deduced by comparing the service and impedance data in Example 1 and Example 2. First, the addition of 0.2 mg of In per gram of zinc to the anode mass of mercury-free miniature alkaline zinc-air cells which contain indium-electroplated anode cups did not significantly improve or detract from service performance on a 625 ohm continuous test. Second, the addition of 0.2 mg of In per gram of zinc to the anode mass of mercury-free miniature alkaline zinc-air cells which contain indium-electroplated anode cups did improve the impedance of cells stored at 71° C.

It is to be understood that modifications and changes to the preferred embodiment of the invention herein described can be made without departing from the spirit and scope of the invention.

What is claimed:

1. A zinc-air cell employing a manganese dioxide-containing electrode and a zinc-containing electrode assembled within a conductive housing comprising a cathode cup having at least one opening to permit air to enter and said cathode cup being electrically contacted to the manganese dioxide-containing electrode; an anode cup electrically and physically contacted to the zinc-containing electrode; said cathode cup secured to and insulated form the anode cup; and said anode cup comprising a steel substrate having on a portion of the inner surface contacted to the zinc-containing electrode an underlayer of copper and a top layer of indium and having a nickel layer plated on the substrate's surface that does not contain the underlayer of copper and top layer of indium.

2. The zinc-air cell of claim 1 wherein the thickness of the indium layer is between about 0.5 microinch and 50 microinches.

3. The zinc-air cell of claim 1 wherein the thickness of the indium layer is between about 1 microinch and 5 microinches.

4. The zinc-air cell of claim 1 wherein the copper layer is at least 1 microinch.

5. The zinc-air cell of claim 1 wherein the zinc-containing electrode contains less than 6% mercury based on the weight of the zinc.

6. The zinc-air cell of claim 1 wherein the zinc-containing electrodes does not contain any mercury.

7. The zinc-air cell of claim 1 wherein the zinc-containing electrode contains a minor amount of indium.

8. The zinc-air cell of claim 7 wherein the zinc-containing electrode does not contain any mercury.

9. The zinc-air cell of claim 1 wherein the thickness of the copper layer is at least 1 microinch; the thickness of the indium layer is between about 1.0 microinch and 5 microinches; and the zinc-containing electrode contains less than 6% mercury based on the weight of the zinc.

10. The zinc-air cell of claim 9 wherein the zinc-containing electrode does not contain any mercury.

11. The zinc-air cell of claim 1 wherein the indium layer is discontinuous.

12. The zinc-air cell of claim 1 wherein the indium layer covers less than 95% of the surface areas of the anode cup that contacts the zinc-containing electrode.

13. A method for producing an anode cup for a zinc-air cell which comprises the steps:
    (a) depositing a layer of copper on the bare side of a nickel clad steel sheet and then electroplating onto said copper layer a coating of indium; and
    (b) forming the coated sheet into a cup shaped configuration defining a cavity in which the indium layer forms the inner surface defining the cavity.

14. The method of claim 13 wherein in step (a) the indium layer is deposited to between about 0.5 microinch and 50 microinches.

15. The method of claim 13 wherein in step (a) the indium layer is discontinuous.

16. The method of claim 15 wherein the indium layer covers less than 95% of the copper layer.

17. A method for producing a zinc-air cell which comprises the steps;
    (a) depositing a layer of copper on the bare side of a nickel clad steel sheet and then electroplating onto said copper layer a coating of indium;
    (b) forming the coated sheet into a cup shaped configuration defining a cavity in which the indium layer forms the inner surface defining the cavity; and
    (c) filling the anode cup with a zinc-containing electrode; preparing a cathode cup and filling said cathode cup with a manganese dioxide-containing electrode; and then assembling the anode cup and the cathode cup so that the anode cup is secured to and electrically insulated from the cathode cup thereby forming an assembled zinc air cell.

18. The method of claim 17 wherein the zinc-containing electrode does not contain any mercury.

* * * * *